(12) United States Patent
Sipitca

(10) Patent No.: US 11,184,638 B1
(45) Date of Patent: Nov. 23, 2021

(54) SYSTEMS AND METHODS FOR SELECTING RESOLUTIONS FOR CONTENT OPTIMIZED ENCODING OF VIDEO DATA

(71) Applicant: Facebook, Inc., Menlo Park, CA (US)

(72) Inventor: Mihai Sipitca, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/931,401

(22) Filed: Jul. 16, 2020

(51) Int. Cl.
*H04N 19/59* (2014.01)
*H04N 19/65* (2014.01)
*H04N 19/147* (2014.01)

(52) U.S. Cl.
CPC .......... *H04N 19/59* (2014.11); *H04N 19/147* (2014.11); *H04N 19/65* (2014.11)

(58) Field of Classification Search
CPC .... H04N 19/147; H04N 19/176; H04N 19/59; H04N 19/65; H04N 19/33; H04N 19/19; H04N 19/154; H04N 19/567
USPC ........................................ 375/240.01–240.29
See application file for complete search history.

(56) References Cited

U.S. PATENT DOCUMENTS

| | | | | |
|---|---|---|---|---|
| 8,290,038 | B1 * | 10/2012 | Wang ..................... | H04N 19/14 375/240.02 |
| 2011/0170595 | A1 * | 7/2011 | Shi .......................... | H04N 19/59 375/240.16 |
| 2013/0188686 | A1 * | 7/2013 | Tourapis ................. | H04N 19/59 375/240.02 |
| 2015/0124871 | A1 * | 5/2015 | Cohen .................... | H04N 19/126 375/240.03 |

FOREIGN PATENT DOCUMENTS

| | | | | |
|---|---|---|---|---|
| WO | WO-2012058394 | A1 * | 5/2012 | ........... H04N 19/117 |
| WO | WO-2015102975 | A2 * | 7/2015 | ........... H04N 19/593 |

OTHER PUBLICATIONS

Huang et al. "Adaptive Downsampling Video Coding With Spatially Scalable Rate-Distortion Modeling" 2014 IEEE, 12 Pages (Year: 2014).*
Dong et al., "Adaptive Downsampling for High-Definition Video Coding", IEEE Transactions on Circuits and Systems for Video Technology, vol. 24, No. 3, Mar. 2014, pp. 480-488.
Aaron et al., "Per-Title Encode Optimization." URL: https://netflixtechblog.com/per-title-encode-optimization-7e99442b62a2, Feb. 14, 2015, 13 pages.

(Continued)

*Primary Examiner* — Nathnael Aynalem
(74) *Attorney, Agent, or Firm* — FisherBroyles, LLP

(57) ABSTRACT

A disclosed computer-implemented method may include receiving a media item for encoding via a content optimized encoding algorithm. The method may also include determining, in accordance with the content optimized encoding algorithm, an overall error model for the media item. The overall error model may include (1) a rate-distortion model for the media item, and (2) a downsampling-distortion model for the media item. The method may also include determining, based on the overall error model, a bitrate cost associated with streaming of the media item within a bitrate lane. The method may further include adjusting the overall error model based on the bitrate cost associated with streaming of the media item within the bitrate lane and encoding the media item for streaming within the bitrate lane based on the adjusted overall error model.

20 Claims, 10 Drawing Sheets

(56) References Cited

OTHER PUBLICATIONS

Covell et al., "Optimizing Transcoder Quality Targets Using a Neural Network with an Embedded Bitrate Model", International Symposium on Electronic Imaging, Visual Information Processing and Communication, vol. 2, Article 237, Feb. 2016, pp. 1-7.

\* cited by examiner

SYSTEMS AND METHODS FOR SELECTING RESOLUTIONS FOR CONTENT OPTIMIZED ENCODING OF VIDEO DATA

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
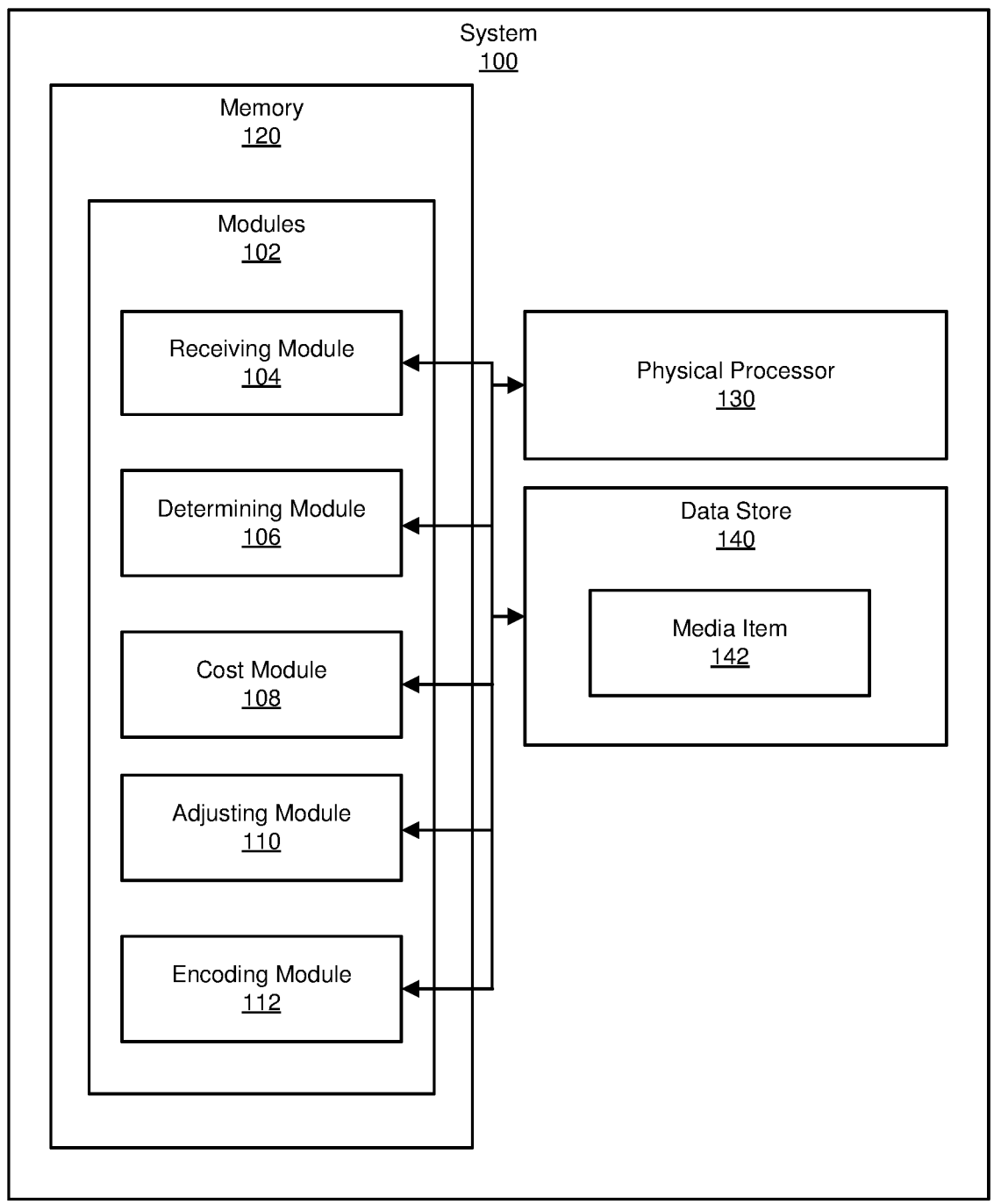
FIG. 1 is a block diagram of an example system for selecting resolutions for content optimized encoding of video data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Before streaming videos to client devices, conventional video-streaming services typically encode the videos at multiple bitrates and/or multiple resolutions in order to accommodate for the client devices' capabilities, the client devices' available bandwidths, and/or the general variability of the client devices' bandwidths. Early video-streaming services used fixed "bitrate ladders" (e.g., a fixed set of bitrate-resolution pairs) to encode videos at multiple bitrates. However, as the complexity of videos can differ drastically, the use of fixed bitrate ladders generally results in bits being over-allocated for simple videos and/or bits being under-allocated for complex videos. For at least this reason, many conventional video-streaming services perform various complexity-based optimizations when encoding videos to increase or maximize perceived quality for any particular bandwidth. However, conventional techniques for optimized video encoding have typically been very computationally expensive. For example, a conventional per-title encoding system may attempt to select an optimized bitrate ladder for each media item by encoding the media item at multiple bitrate-resolution pairs, determining a quality metric of each bitrate-resolution pair, and selecting a bitrate ladder (i.e., convex hull) that best optimizes the quality metric.

While this content-optimized encoding (COE) approach may achieve significant quality improvements over other methodologies, there may be drawbacks as well. For example, some COE encoding methods and/or codecs may have an increased incidence of rebuffering events over conventional encoding approaches. These rebuffering events may seriously impact the quality of the user experience. Furthermore, the limited and/or inconsistent data delivery speed of mobile data networks may make them particularly susceptible to such rebuffering events.

The systems and methods described herein are generally directed to systems and methods for selecting resolutions for content optimized encoding of video data. As will be described in greater detail below, an example embodiment of the systems and methods described herein may select resolutions for content optimized encoding of video data by receiving a media item for encoding via a content optimized encoding algorithm. The example embodiment may also determine, in accordance with the content optimized encoding algorithm, and overall error model for the media item. In some examples, the overall error model for the media item may include (1) a rate-distortion model for the media item, and (2) a downsampling-distortion model for the media item. The example embodiment may also determine, based on the overall error model, a bitrate cost associated with streaming of the media item within a bitrate lane. The example embodiment may adjust the overall error model based on the bitrate cost associated with streaming of the media item within the bitrate lane and may encode the media item for streaming within the bitrate lane based on the adjusted overall error model.

Some video streaming services may employ a technique or method known as adaptive bitrate streaming to stream media over one or more computer networks. By detecting a user's bandwidth and CPU capacity in real-time, adaptive bitrate streaming systems may dynamically adjust quality of the media stream accordingly.

More specifically, adaptive bitrate streaming is a method of streaming media where the source content is encoded at multiple bitrates, such as 100 kilobits per second (kbps), 220 kbps, 400 kbps, 750 kbps, 1.5 megabits per second (Mbps), 2.6 Mbps, and so forth. Each of the different bitrate streams or "bitrate lanes" are segmented into small multi-second parts. A client may download a manifest file that describes the available stream segments and their respective bitrates. The client may request segments from a relatively low bitrate stream during start up and, if the client finds that the network throughput is greater than the bitrate of the downloaded segment, it may request a higher bitrate segment. Later, if the client finds that the network throughput has deteriorated, it may request a lower bitrate segment. The client may use an adaptive bitrate algorithm to decide which bitrate segments to download, based on the current state of the network.

Adaptive bitrate algorithms may choose original resolutions for encoding based on any suitable criteria. In some examples, an adaptive bitrate algorithm (e.g., VP9, H.264, H.265, etc.) may choose original resolutions for encoding from the following set: 1080p, 720p, 480p, 360p, 240p, 144p, 108p, and/or 72p. The adaptive bitrate algorithm may start with the highest resolution possible (i.e., the original resolution) at the highest bitrate lane. Then, it may decrease by one step the resolution for each of the subsequent, lower bitrate lanes. For example, if the highest bitrate lane is 1.5

Mbps, and the original resolution is 720p, the adaptive algorithm may associate the following resolutions with the following bitrate lanes: 1.5 Mbps 720p, 750 kbps 480p, 400 kbps 360p, 220 kbps 240p, 100 kbps 144p.

As will be described in greater detail below, some media streaming services may employ content optimized encoding (also "COE" herein) algorithms alongside or in concert with adaptive bitrate algorithms. In some examples, a "content optimized encoding algorithm" may include any suitable media encoding algorithm that may produce an encoded version of a media item wherein the encoding of the media item is optimized based on content of the media item. For example, a suitable content optimized encoding algorithm may attempt to select an optimized bitrate ladder for each media item by (1) encoding the video at multiple bitrate-resolution payers, (2) determining a quality metric of each bitrate-resolution pair, and (3) selecting the bitrate ladder (i.e., convex hull) that best optimizes the quality metric.

When content optimized encoding algorithms are employed alongside or in concert with adaptive bitrate algorithms, optimal resolutions may have less variation across bitrate lanes. For example, a COE-VP9 algorithm may result in the following associations of resolutions with bitrate lanes: 1.5 Mbps→480p, 750 kbps→480p, 400 kbps→480p, 220 kbps→360p, 100 kbps→240p.

Unfortunately, some experimental results may indicate an increased prevalence of stall or mean time between rebuffering (MTBR) regressions for COE-VP9 when compared with plain VP9. These regressions may be especially apparent when a client streams media via a low bandwidth connection such as a cellular mobile connection. Cellular connectivity may imply or suggest use of lower bitrate lanes (e.g., bitrate lanes equal to or lower than 750 kbps). Further analysis may indicate that a ratio between a COE-VP9 average delivered bitrate and a conventional VP9 average delivered bitrate may exceed 1.0, as illustrated by the following table:

| Lane (kbps) | COE-VP9 (kbps) | VP9 (kbps) | Ratio |
|---|---|---|---|
| 100 | 135 | 131 | 1.03 |
| 220 | 255 | 232 | 1.10 |
| 400 | 420 | 399 | 1.05 |
| 750 | 676 | 724 | 0.93 |
| 1500 | 1240 | 1390 | 0.89 |
| 2600 | 1680 | 2280 | 0.74 |

This data may be explained by a dependence between encoding resolution and bitrate: COE-VP9 may have better quality metrics at lower bitrate lanes because it may use larger original resolutions to encode media items. However, use of those larger original resolutions may result in higher bitrates of the encoded media items.

In some circumstances, rate control features of an adaptive bitrate algorithm may compensate for such discrepancies by increasing a quantization parameter (QP) to bring an encoded bitrate closer to a target bitrate, commensurately reducing the quality of the encoded media item. However, rate control features of adaptive bitrate algorithms are imperfect and may not properly account for such variability. Furthermore, some uses of streaming media (e.g., streaming video within a timeline of a social media system) may use or accommodate media items with relatively short play times. Thus, rate control features may not have enough time to bring an encoded bitrate closer to a target bitrate. Conventional content optimized encoding algorithms may also be insufficient to account for this variability of encoded bitrate, as conventional content optimized encoding algorithms may tacitly assume that, no matter the resolution, the resulting encoded bitrate is close to the target bitrate.

Hence, the systems described herein may reduce stall/MTBR regressions while only minimally modifying quality metrics of encoded media items by adjusting how content optimized encoding algorithms may select encoding resolutions for bitrate lanes. These improvements may also contribute to an increased efficiency in use and/or conservation of telecommunication resources (e.g., network bandwidth resources, computing resources, data storage resources, etc.).

Note that while some examples herein are given with respect to a VP9 codec, this intended by way of example and not limitation. It may be appreciated that the systems and methods described herein may be applied to and/or implemented using any suitable audio and/or video codec including, without limitation, VP9, AV1, H.264, H.265, and so forth.

The following will provide, with reference to FIGS. 1-2 and 4-10, detailed descriptions of systems for selecting resolutions for content optimized encoding of video data. Detailed descriptions of corresponding computer-implemented methods will also be provided in connection with FIG. 3.

FIG. 1 is a block diagram of an example system 100 for selecting resolutions for content optimized encoding of video data. As illustrated in this figure, example system 100 may include one or more modules 102 for performing one or more tasks. As will be explained in greater detail below, modules 102 may include a receiving module 104 that may receive a media item for encoding via a content optimized encoding algorithm. Example system 100 may also include a determining module 106 that may determine, in accordance with the content optimized encoding algorithm, an overall error model for the media item. In some examples, the overall error model may include (1) a rate-distortion model for the media item, and (2) a downsampling-distortion model for the media item. Example system 100 may also include a cost module 108 that may determine, based on the overall error model, a bitrate cost associated with streaming of the media item within a bitrate lane. Additionally, example system 100 may also include an adjusting module 110 that may adjust the overall error model based on the bitrate cost associated with streaming of the media item within the bitrate lane, and an encoding module 112 that may encode the media item for streaming within the bitrate lane based on the adjusted overall error model.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate selecting resolutions for content optimized encoding of video data. Examples of physical processor 130 include, without limitation, microprocessors, microcontrollers, central processing units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As also shown in FIG. 1, example system 100 may also include one or more data stores, such as data store 140, that may receive, store, maintain, and/or otherwise interact with data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a NoSQL database, a NewSQL database, and/or any other suitable organized collection of data.

In at least one example, data store 140 may include (e.g., store, host, access, maintain, etc.) at least one media item 142. In some examples, a "media item" may include any portion of a file, document, or other data item that may be stored by data store 140 and that may include any combination of text information, audio information, visual information, audiovisual information, and so forth. In some examples, a media item may include data representative of a video file (e.g., an electronic representation of moving visual images in the form of encoded digital data). In some examples, a media item may include any suitable combination of visual information, audio information, textual information, and so forth.

Figure 2:
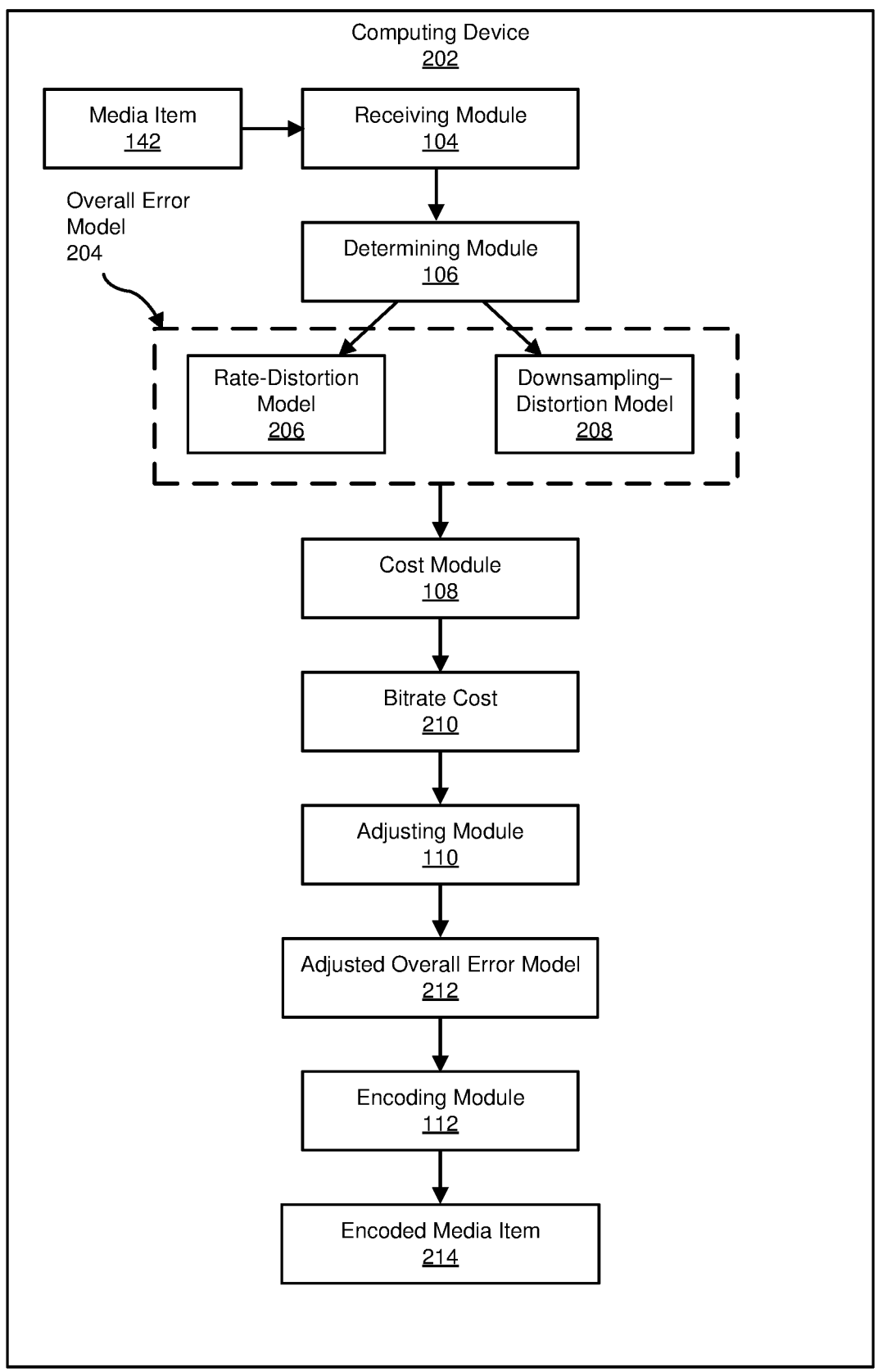
FIG. 2 is a block diagram of an example implementation of a system for selecting resolutions for content optimized encoding of video data.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202. In at least one example, computing device 202 may be programmed with one or more of modules 102 (e.g., receiving module 104, determining module 106, cost module 108, adjusting module 110, and/or encoding module 112).

In at least one embodiment, one or more modules 102 from FIG. 1 may, when executed by computing device 202, enable computing device 202 to perform one or more operations to select resolutions for content optimized encoding of video data. For example, as will be described in greater detail below, receiving module 104 may cause computing device 202 to receive a media item (e.g., media item 142) for encoding via a content optimized encoding algorithm. In some examples determining module 106 may cause computing device 202 to determine, in accordance with the content optimized encoding algorithm, and overall error model for the media item (e.g., overall error model 204). In some examples, the overall error model may include a rate-distortion model for the media item (e.g. rate-distortion model 206) and/or a downsampling-distortion model (e.g., downsampling-distortion model 208).

In at least one embodiment, cost module 108 may cause computing device 202 to determine, based on the overall error model, a bitrate cost associated with streaming of the media item within a bitrate lane (e.g., bitrate cost 210). In some examples, adjusting module 110 may cause computing device 202 to adjust the overall error model based on the bitrate cost associated with streaming of the media item within the bitrate lane (thereby generating and/or creating, e.g., adjusted overall error model 212). Furthermore, encoding module 112 may cause computing device 202 to encode the media item for streaming within the bitrate lane based on the overall error model (resulting in, e.g., encoded media item 214).

Computing device 202 generally represents any type or form of computing device capable of reading and/or executing computer-executable instructions. In at least one embodiment, user device 202 may accept one or more directions from one or more additional computing devices and/or one or more users (e.g., one or more administrative users). Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

In at least one example, computing device 202 may be programmed with one or more of modules 102. All or a portion of the functionality of modules 102 may be performed by computing device 202 and/or any other suitable computing device and/or system. As will be described in greater detail below, one or more of modules 102 from FIG. 1 may, when executed by at least one processor of computing device 202, may enable computing device 202 to select resolutions for content optimized encoding of video data.

Many other devices or subsystems may be connected to example system 100 in FIG. 1 and/or example system 200 in FIG. 2. Conversely, all of the components and devices illustrated in FIG. 1 and/or FIG. 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
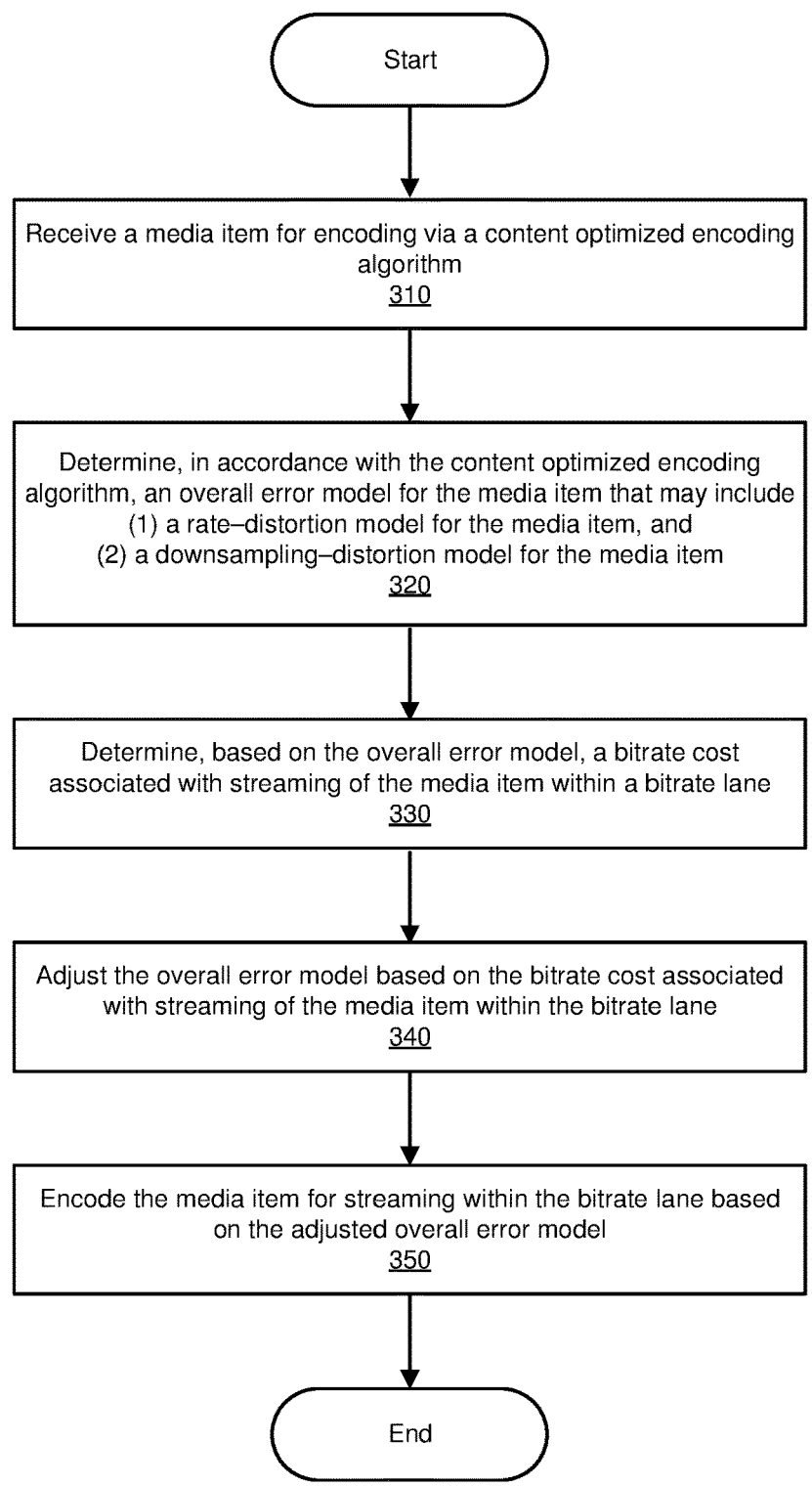
FIG. 3 is a flow diagram of an example method for selecting resolutions for content optimized encoding of video data.
Figure 4:
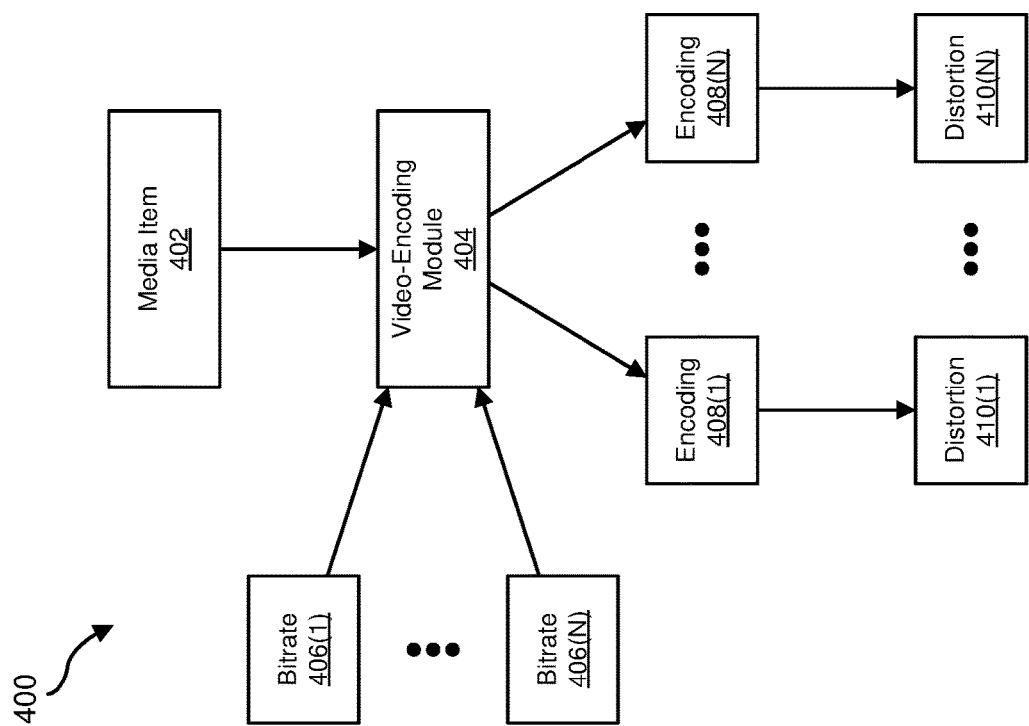
FIGS. 4 and 5 are block diagrams of example data flows for determining rate-distortion models, according to some embodiments.
Figure 5:
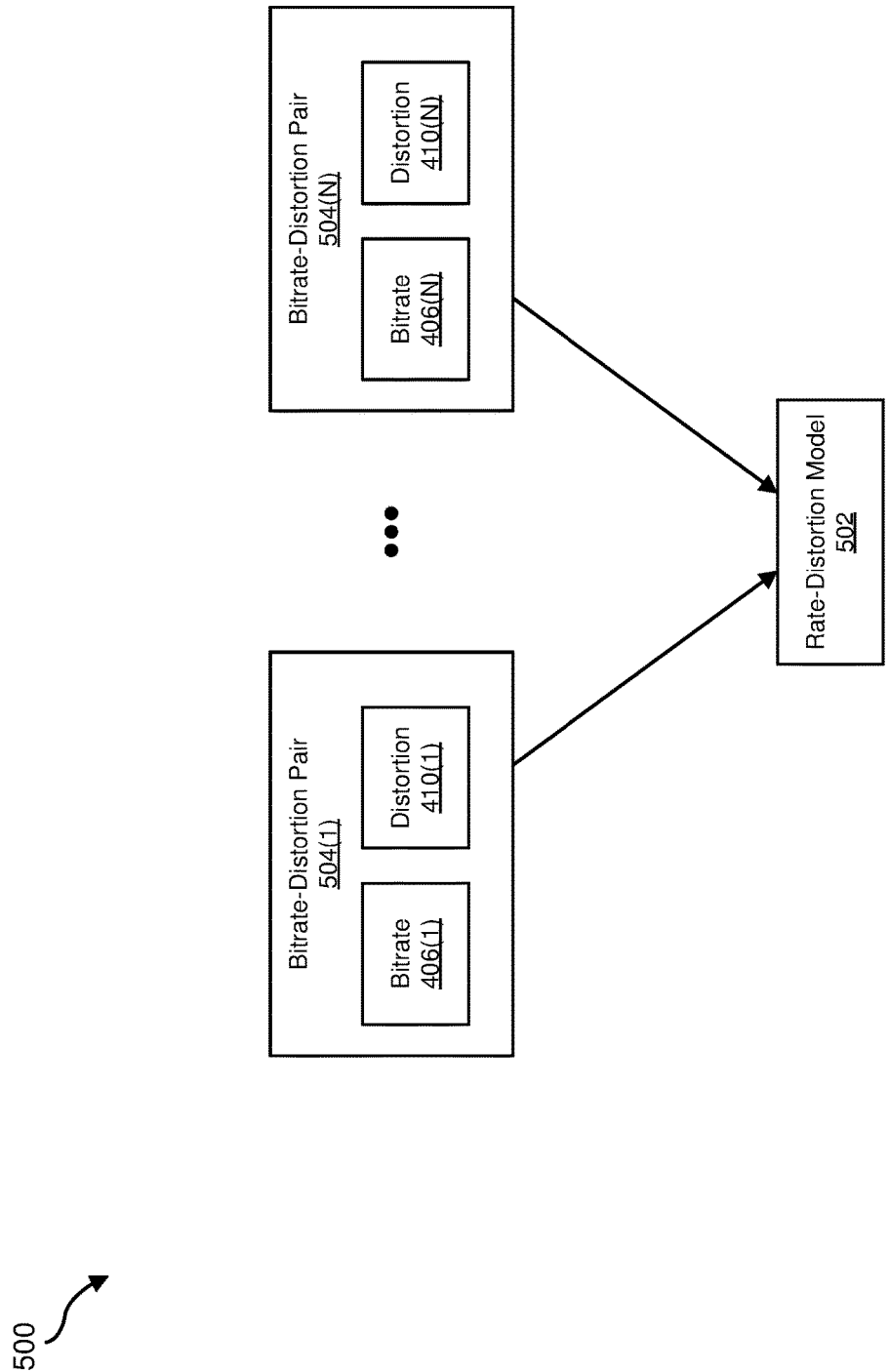
Figure 6:
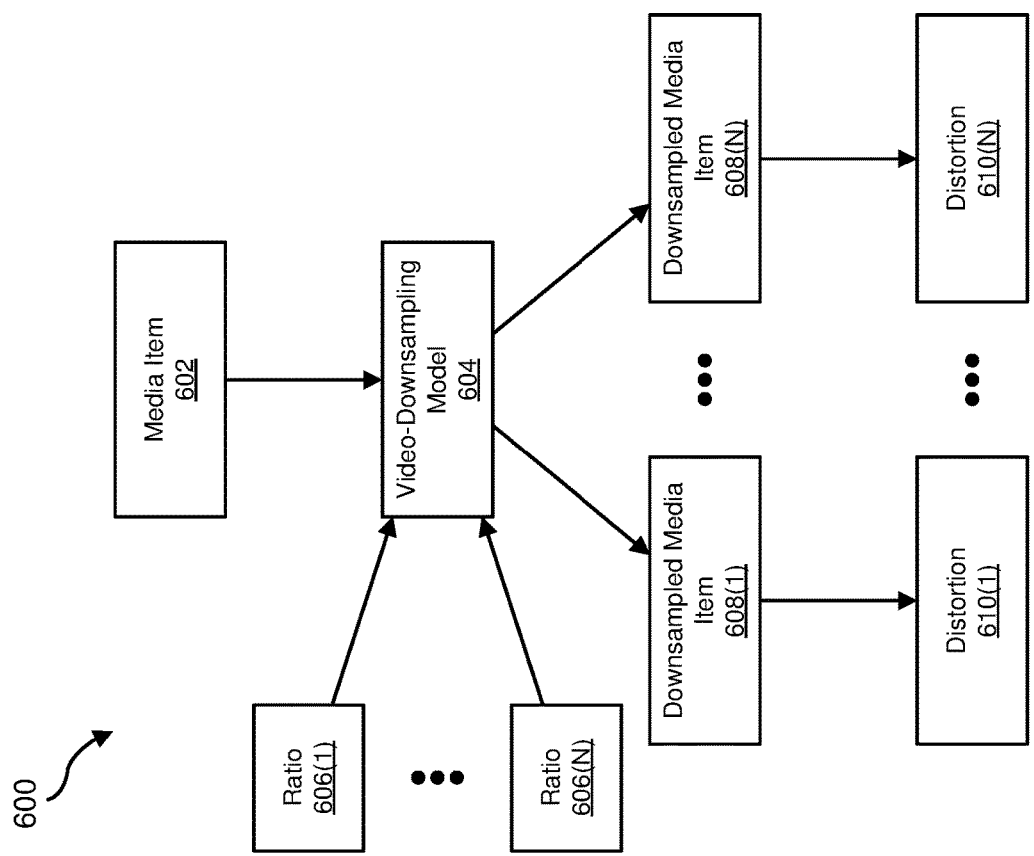
FIGS. 6 and 7 are block diagrams of example data flows for determining downsampling-distortion models, according to some embodiments.
Figure 7:
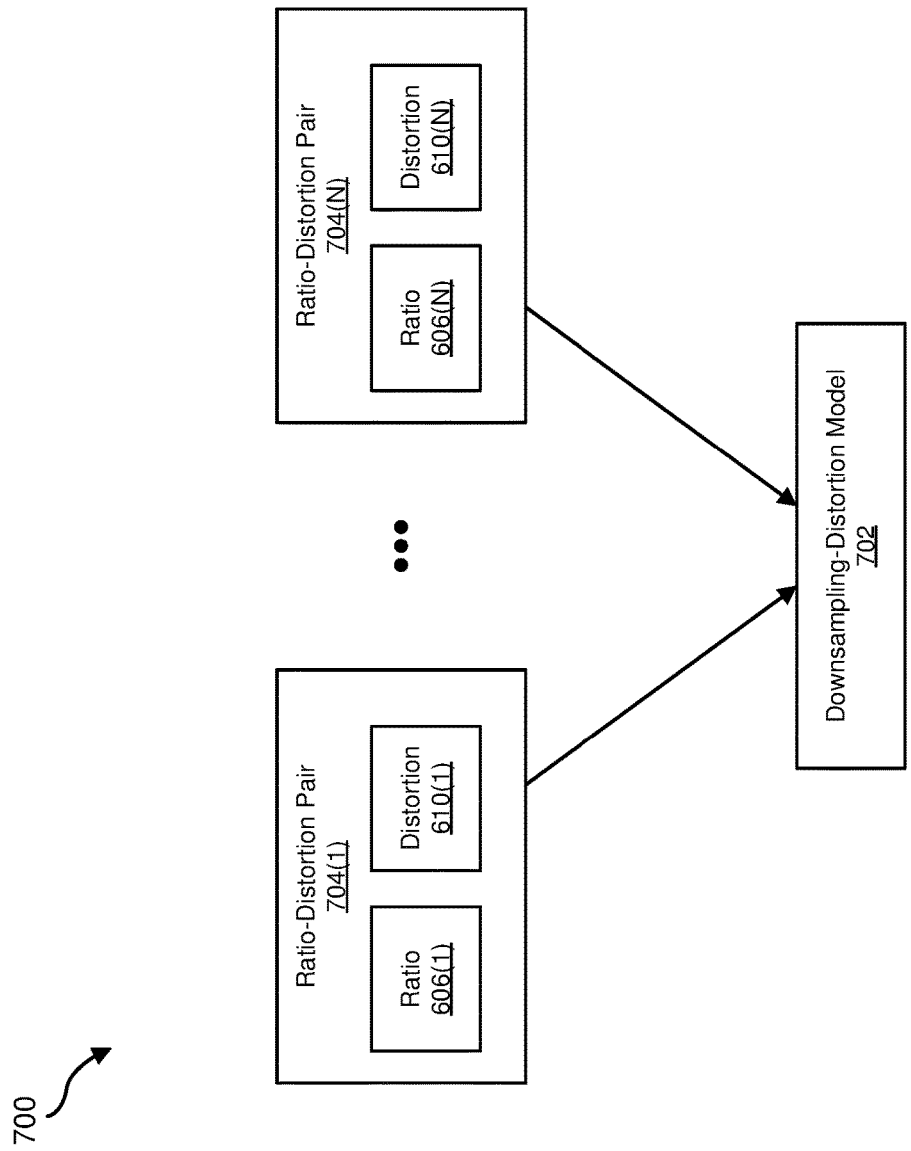

FIG. 3 is a flow diagram of an example computer-implemented method 300 for selecting resolutions for content optimized encoding of video data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive a media item for encoding via a content optimized encoding algorithm. For example, receiving module 104 may, as part of computing device 202, cause computing device 202 to receive media item 142 for encoding via a content optimized encoding algorithm. Receiving module 104 may cause computing device 202 to receive media item 142 in any suitable way. For example, receiving module 104 may cause computing device 202 to access data store 140 and may retrieve media item 142 from data store 140, and hence may cause computing device 202 to receive media item 142.

Returning to FIG. 3, at step 320, one or more of the systems described herein may determine, in accordance with the content optimized encoding algorithm, an overall error model for the media item that may include (1) a rate-distortion model for the media item, and (2) a downsampling-distortion model for the media item. For example, determining module 106 may, as part of computing device 202, cause computing device 202 to determine, in accordance with the content optimized encoding algorithm, overall error model 204 that may include (1) rate-distortion model 206, and (2) downsampling-distortion model 208.

The systems described herein (e.g., determining module 106) may perform step 320 in a variety of ways. In one example, the systems described herein may estimate a rate-distortion model of a media item using a predetermined number (e.g., as few as 4) of bitrate-distortion data points derived from the media item. For example, the systems described herein may estimate a rate-distortion model for a media item by (1) encoding the media item at a predetermined number of bitrates and/or at its original resolution and (2) measuring a distortion metric (e.g., a mean squared error (MSE) or Peak Signal-to-Noise Ratio (PSNR)) of each resulting encoded media item. Using data flow 400 and data flow 500 in FIGS. 4 and 5 as an example, video-encoding module 404 may encode a media item 402 at each of bitrates 406(1)-(N) to create encodings 408(1)-(N), respectively. Video-encoding module 404 may then respectively measure distortions 410(1)-(N) of encodings 408(1)-(N). In one example, the systems described herein may generate bitrate-distortion pairs 504(1)-(N) from bitrates 406(1)-(N) and distortions 410(1)-(N) and may use bitrate-distortion pairs 504(1)-(N) to construct or derive rate-distortion model 502.

In some embodiments, a rate-distortion model for a media item may be represented by equation (1) or equation (2), wherein R represents a media item's bitrate (or bitrate lane), r represents the number of bits allocated to each pixel (e.g., bits per pixel (bpp)) according to equation (3), where F represents a media item's frame rate, where W and H represent the media item's width and height, and where and a are content-dependent parameters:

$$D = \frac{\beta}{R^\alpha} \quad (1)$$

$$D = \frac{\beta}{r^\alpha} \quad (2)$$

$$r = \frac{R}{(F \times W \times H)} \quad (3)$$

In some embodiments, the systems described herein may estimate $\beta$ and $\alpha$ for a media item by (1) encoding the media item at a predetermined number of bitrates $R_0$, $R_1$, $R_2$, ..., $R(N-1)$, (2) measuring a distortion metric (e.g., a mean squared error (MSE) or Peak Signal-to-Noise Ratio (PSNR)) of each resulting encoded video to get a corresponding set of distortions $D_0$, $D_1$, $D_2$, ..., $D_{(N-1)}$, normalizing bitrates $R_0$, $R_1$, $R_2$, ..., $R_{(N-1)}$ to bpps $r_0$, $r_1$, $r_2$, ..., $r_{(N-1)}$, normalizing $D_0$, $D_1$, $D_2$, ..., $D_{(N-1)}$ to $d_0$, $d_1$, $d_2$, ..., $d_{(N-1)}$, and solving equation (4):

$$[\beta_{opt}, \alpha_{opt}] = \underset{\beta,\alpha}{\operatorname{argmin}} \sum_{i=0}^{N-1} \left(d_i - \frac{\beta}{r_i^\alpha}\right)^2 \quad (4)$$

In some embodiments, one or more of the systems described herein may determine a downsampling-distortion model for media item 142. In some examples, "downsampling-distortion model" may include an algorithm, curve, heuristic, data, or combination thereof, that maps downsampling ratios (or resolutions) at which a video or a media item may be downsampled to estimates or measurements of the distortions or the qualities of the resulting encoded videos or media items. Using FIG. 7 as an example, a downsampling-distortion model 702 may include ratio-distortion pairs 704(1)-(N) each consisting of a downsampling ratio and a corresponding distortion metric. In some embodiments, the term "downsampling-distortion model" may refer to a resolution-quality model or a downsampling-error model.

In one example, the systems described herein (e.g., determining module 106) may determine a downsampling-distortion model for a media item by (1) downsampling the media item at a predetermined number of downsampling ratios and (2) measuring a distortion metric (e.g., a mean squared error (MSE)) or of each resulting encoded media item. Using data flow 600 and data flow 700 in FIGS. 6 and 7 as an example, video-downsampling module 604 may downsample a media item 602 at each of downsampling ratios 606(1)-(N) to create downsampled media items 608 (1)-(N), respectively. Video-downsampling module 604 may then respectively measure distortions 610(1)-(N) of downsampled media items 608(1)-(N). In one example, the systems described herein may generate ratio-distortion pairs 704(1)-(N) from downsampling ratios 606(1)-(N) and distortions 610(1)-(N) and may use ratio-distortion pairs 704 (1)-(N) to construct or derive downsampling-distortion model 702.

In some embodiments, the systems disclosed herein may use a suitable encoding, transcoding, or downsampling tool or application to directly calculate downsampling errors for a predetermined number of target downsampling resolutions (e.g., 720p, 480p, 360p, 240p, 144p, etc.) and may use the calculated downsampling errors to estimate a downsampling-distortion model. In some embodiments, the systems disclosed herein may model downsampling errors using a suitable frequency-domain analysis technique. Determining module 106 may determine rate-distortion model 206 and downsampling-distortion model 208 in any order, in series, or in parallel.

Each media item may have different characteristics (e.g., complexities). For at least this reason, the systems described herein may determine a different rate-distortion model for each unique media item and a different downsampling-distortion model for each unique media item. In some embodiments, the systems described herein may combine a media item's rate-distortion and downsampling-distortion models to model relationships between bitrates, complexities, and/or qualities. This may result in an overall error model for the media item (e.g., overall error model 204 for media item 142).

As will be described in greater detail below, one or more of the systems described herein may determine or select a per-item resolution for a media item (e.g., media item 142) based on the overall error model of the media item (e.g., the rate-distortion model of the media item and the downsampling-distortion model of the media item). For example, encoding module 112 may use overall error model 204 that may include rate-distortion model 206 and downsampling-distortion model 208 of media item 142 to determine or select a resolution for encoded media item 214.

The systems described herein may determine or select the per-item resolution for the media item in a variety of ways.

In one example, the systems described herein may use a rate-distortion model of a scene and a downsampling-distortion model of a media item to determine, given a target bitrate, an optimal downsampling ratio or resolution for the media item that maximizes overall quality or minimizes overall distortion of the scene. In some embodiments, overall distortion may be equal to, given a particular bitrate, a sum of a coding error or distortion resulting from an encoding operation and a downsampling error or distortion resulting from a downsampling operation. The systems described herein may therefore use a rate-distortion model of a media item to estimate coding distortions and a downsampling-distortion model of the scene to estimate downsampling distortions.

Figure 8:
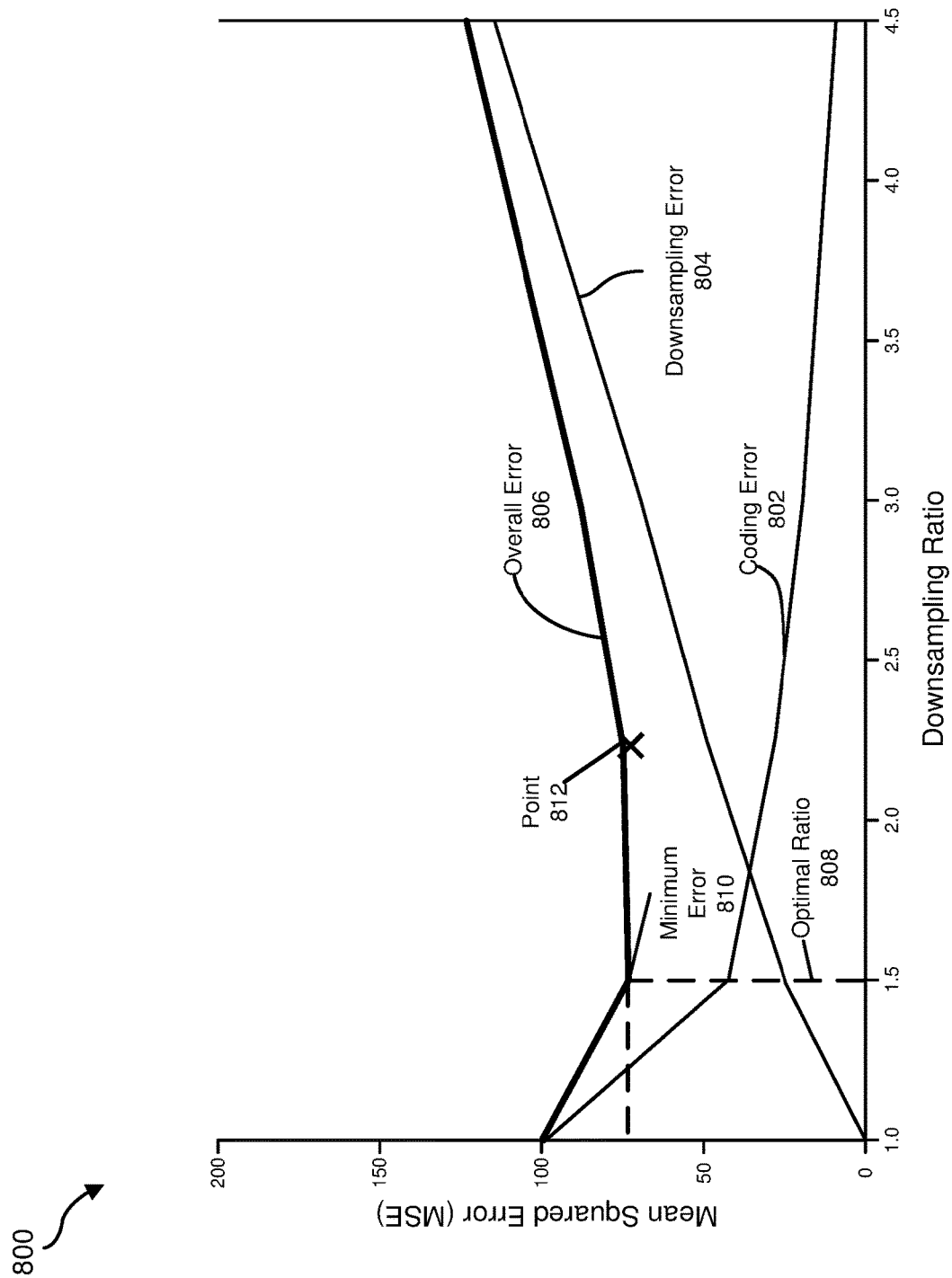
FIGS. 8 and 9 are diagrams of example error curves, according to some embodiments.

Graph 800 in FIG. 8 illustrates an example of a visual representation of an overall error model for a media item. Graph 800 includes a coding error curve 802 associated with a particular bitrate lane (e.g., 1.0 Mbps, 400 kbps, 220 kbps, etc.), an exemplary downsampling error curve 804 associated with the bitrate lane, and an exemplary overall error curve 806 (i.e., a sum of coding error curve 802 and downsampling error curve 804) for a particular media item (e.g., media item 142) streamed within the bitrate lane.

In some embodiments, the systems described herein may derive the curves shown in FIG. 8 using the rate-distortion model and downsampling-distortion model of a media item (e.g., media item 142). As illustrated in FIG. 8, coding error curve 802 may monotonically decrease with downsampling ratio. On the other hand, downsampling error curve 804 may monotonically increase with downsampling ratio. In the example shown, the systems described herein may determine an optimal downsampling ratio 808 by determining that overall error 806 is at a minimum error 810 at downsampling ratio 808. It may be noted, however, that point 812 has only a slightly higher MSE but corresponds to a higher downsampling ratio (e.g., a lower resolution). As will be described in greater detail below, it may, in some instances, be preferable to use a higher downsampling ratio, such as to avoid re-buffering errors. Hence, in some embodiments, the systems described herein may adjust an overall error model to introduce a bias toward higher downsampling ratios.

Returning to FIG. 3, at step 330, one or more of the systems described herein may determine, based on the overall error model, a bitrate cost associated with streaming of the media item within a bitrate lane. For example, cost module 108 may, as part of computing device 202, cause computing device 202 to determine, based on overall error model 204, a bitrate cost associated with streaming of media item 142 within a bitrate lane.

In some embodiments, "bitrate" may include rate of data transfer over a network or digital connection. In these embodiments, a bitrate may be expressed as the number of bits transmitted per second, such as megabits per second (Mbps). Additionally, a bitrate may represent a network bandwidth (e.g., a current or available network bandwidth between system 200 and a client device) and/or an expected speed of data transfer for videos over a network (e.g., an expected speed of data transfer for videos over a network that connects system 200 to a client device.

Additionally, in some embodiments, a "bitrate cost" may include and/or represent any suitable value or factor that may model and/or relate to a cost of streaming a media item encoded via a content optimized encoding algorithm within a particular bitrate lane. For example, as described above, there may be a bitrate cost associated with selecting a higher resolution for encoding via a content optimized encoding algorithm.

One or more of the systems described herein may model this bitrate cost and may adjust an overall error curve associated with the content optimized encoding algorithm based on the modeled bitrate cost. The introduction of the bitrate cost into the overall error model may therefore result in one or more of the systems described herein effectively penalizing selection of higher resolutions for encoding. Thus, if two points on an initial overall error curve have very close error values (e.g., MSEs), as in the example shown in FIG. 8, this may result in one or more of the systems described herein selecting a point corresponding to a lower resolution.

In some examples, a bitrate cost may include a relationship between downsampling ratio and total MSE associated with a bitrate lane in the overall error model. In additional or alternative examples, the bitrate cost may be proportional to total MSE in the overall error model. For example, the bitrate cost may be expressed in accordance with equation (5), wherein c represents the bitrate cost, $MSE_{total}$ represents the total MSE of the overall error model, $\lambda_0$ represents a Lagrange multiplier that may be proportional to $MSE_{total}$ (e.g., $\$\lambda_0 = MSE_{total} \times \lambda$) and ratio may represent a downsampling ratio (e.g., 1080p/720p=1.5, 1080p/480p=2.25, etc.):

$$c = MSE_{total} \times (1 - \lambda \times \text{ratio}) \tag{5}$$

Hence, in some examples, the bitrate cost may be proportional to downsampling ratio in the overall error model. Moreover, because scaling ratios may be on a roughly exponential scale, in some examples, the systems described herein may model the bitrate cost such that the bitrate cost is logarithmically proportional to downsampling ratio in the overall error model. By way of illustration, in equation (6), bitrate cost may be logarithmically proportional to downsampling ratio in the overall error model:

$$c = MSE_{total} \times (1 - \lambda \times \log_{10}(\text{ratio})) \tag{6}$$

Base-10 logarithms of downsampling ratios may be roughly equally spaced, therefore a bias introduced may me roughly linear. For example, $\log_{10}$ (1.5)=0.18, $\log_{10}$ (2.25)=0.35, $\log_{10}$ (3)=0.48, $\log_{10}$ (4.5)=0.65, and so forth. Hence, the spacing between two consecutive base-10 logarithmic values of downsampling ratios may be approximately 0.17. A $\lambda$ value of 0.2 may result in a $MSE_{total}$ multiplier of 1−0.2×0.17=0.966. Peak signal-to-noise ratio (PSNR) may be equal to $10 \times \log_{10} MSE_{total}$, and therefore a multiplier of 0.966 may be equivalent to a PSNR difference of about 0.15 dB. Thus, a $\lambda$ value of 0.2 may introduce a bias of 0.15 dB. That is, if a difference between the PSNR for two consecutive downsampling ratios is less than 0.15 dB, embodiments of the systems described herein may prefer a higher downsampling ratio (e.g., a lower resolution). Similar calculations may show that $\lambda$=0.4 may correspond to about 0.3 dB and $\lambda$=0.6 may correspond to about 0.45 dB. PSNR differences of 0.3 dB may typically be small enough to be difficult for users to notice visually. Furthermore, as PSNR may be less reliable at predicting subjective visual quality variations, the systems described herein may select higher resolutions only when PSNR gives a strong indication in favor of selecting higher resolutions.

Cost module 108 may determine, based on overall error model 204, a bitrate cost associated with streaming of media item 142 within a bitrate lane in a variety of ways. For example, cost module 108 may determine the bitrate cost associated with streaming of media item 142 by determining a multiplier (e.g., a suitable $\lambda$ value), and may determine the bitrate cost associated with streaming of media item 142 within the bitrate lane based on the determined multiplier.

Instead of using the same λ value for all bitrate lanes, the systems described herein may, in some embodiments, select, determine, and/or use λ values based on a bandwidth of a particular bitrate lane. For example, cost module 108 may select, determine, and/or use larger λ values for lower bitrate lanes and/or lower λ values for higher bitrate lanes. An example of determined lambda values may be included in the following table:

| Bitrate Lane | λ |
| --- | --- |
| 100k | 0.6 |
| 220k | 0.6 |
| 400k | 0.4 |
| 750k | 0.4 |
| 1.5M | 0.2 |
| 2.6M | 0.2 |

Returning to FIG. 3, at step 340, one or more of the systems described herein may adjust the overall error model based on the bitrate cost associated with streaming of the media item within the bitrate lane. For example, adjusting module 110 may, as part of computing device 202, cause computing device 202 to adjust overall error model 204 based on bitrate cost 210 associated with streaming of media item 142 within the bitrate lane. Adjusting of overall error model 204 by adjusting module 110 may result in the creation and/or generation of adjusted overall error model 212.

Adjusting module 110 may cause computing device 202 adjust overall error model 204 in a variety of contexts. For example, as described above, applying a bitrate cost to an overall error model may introduce a bias into the overall error model that may cause embodiments of the systems described herein to prefer a higher downsampling ratio (e.g., a lower resolution).

Figure 9:
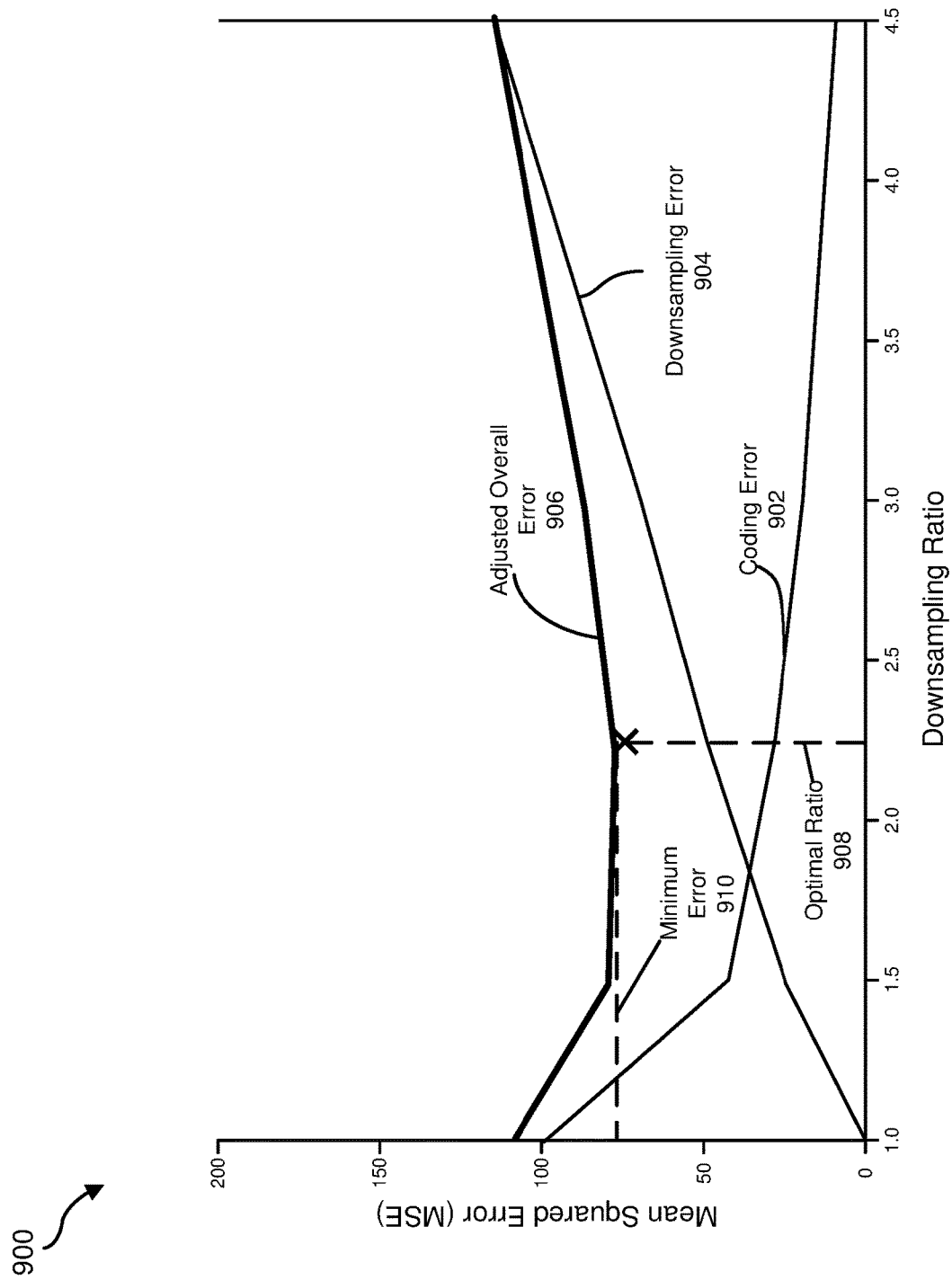

FIG. 9 illustrates a visualization of an adjusted overall error model in the form of graph 900. Graph 900 is similar to graph 800 in that it also includes a coding error curve 902 that is approximately equal to coding error curve 802 and a downsampling error curve 904 that is approximately equal to downsampling error curve 804. However, in this example, one or more of the systems described herein has adjusted the overall error curve 806 to create/generate adjusted overall error curve 906. Adjusted overall error curve 906 has been adjusted, relative to overall error curve 806, to account for a bitrate cost as described herein. Hence, minimum error 910 is slightly different from minimum error 810, and optimal ratio 908 has shifted to a downsampling ratio of 2.25 from a downsampling ratio 1.5 shown in FIG. 8.

Returning to FIG. 3, at step 350, one or more of the systems described herein may encode a media item for streaming within the bitrate lane based on the adjusted overall error model. For example, encoding module 112 may, as part of computing device 202, cause computing device 202 to encode media item 142 for streaming within a bitrate lane based on adjusted overall error model 212.

Encoding module 112 may cause computing device 202 to encode media item 142 for streaming within a bitrate lane based on adjusted overall error model 212 in a variety of ways. For example, encoding module 112 may determine, based on adjusted overall error model 212, a resolution for encoding media item 142 for streaming via a bitrate lane (e.g., 2160p, 1080p, 720p, 480p, 240p, 144p, 72p, etc.). Encoding module 112 may then select a version of media item 142 that has already been sampled at the selected resolution for encoding for streaming via the bitrate lane. Encoding module 112 may then encode the resampled version of media item 142 for streaming via the bitrate lane.

In some examples, the systems described herein may resample a media item from an original resolution to a plurality of different resolutions. An embodiment may then select a resampled version of the media item from the plurality of resampled versions of the media item.

For example, one or more of modules 102 (e.g., determining module 106, encoding module 112, etc.) may generate a plurality (e.g., two or more) of resampled versions of the media item, each resampled version having a different resampled resolution. By way of illustration, determining module 106 may resample media item 142 from an original resolution (e.g., 2160p, 1080p, 720p, 480p, 240p, 144p, 72p, etc.) to a plurality of different resolutions (e.g., 2160p, 1080p, 720p, 480p, 240p, 144p, 72p, etc.), which may result in a plurality of resampled versions of the media item, each resampled version having a different resampled resolution.

Encoding module 112 may then encode the media item (e.g., media item 142) for streaming within a bitrate lane based on the adjusted overall error model by selecting, based on the bitrate lane and the adjusted overall error model, (1) a target resolution for encoded version of the media item (e.g., 2160p, 1080p, 720p, 480p, 240p, 144p, 72p, etc.), and (2) a resampled version of the media item from the plurality of resampled versions of media item. Encoding module 112 may also generate the encoded version of the media item (e.g., encoded media item 214) by encoding the resampled version of the media item for streaming via the bitrate lane. For example, encoding module 112 may, based on the adjusted overall error model and a bitrate lane of 400 kbps, select a target resolution of 480p (i.e., a target resolution of 480p may correspond to an optimum downsampling ratio or optimum resolution according to adjusted overall error model 212). Encoding module 112 may select a resampled version of the media item having the target resolution of 480p and may generate the encoded version of the media item for the 400 kbps bitrate lane by encoding the 480p version of the media item for streaming via the 400 kbps bitrate lane.

Figure 10:
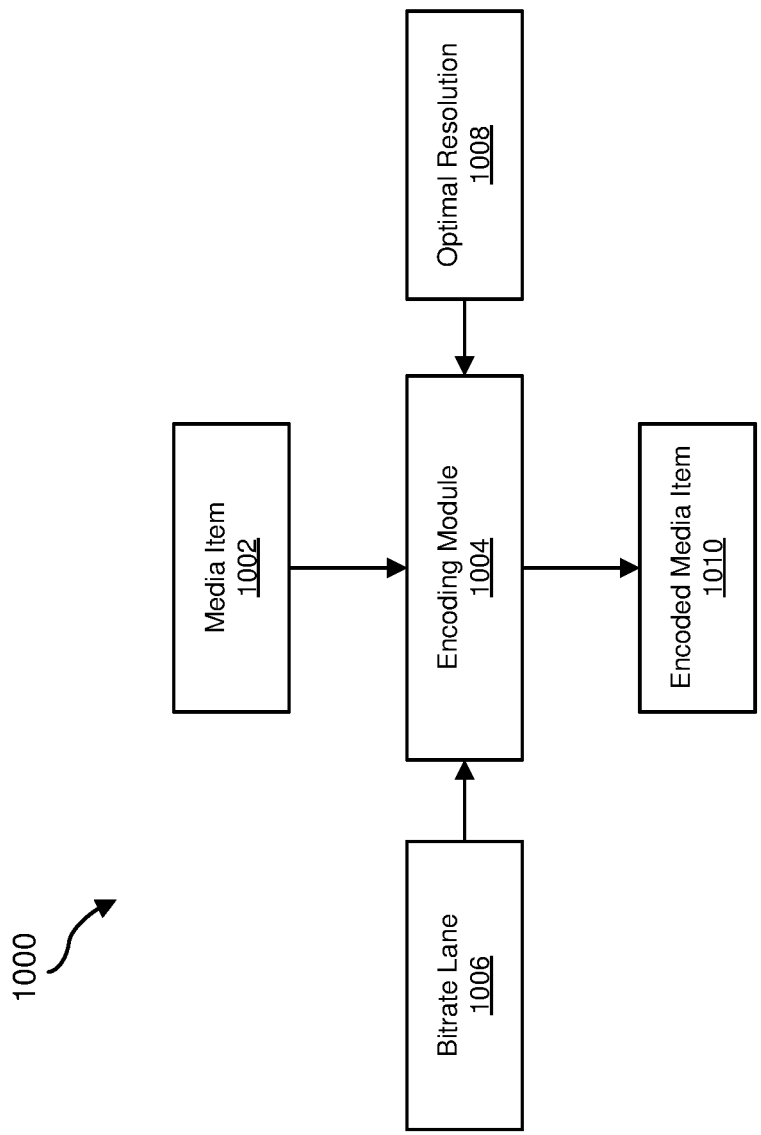
FIG. 10 is a block diagram of an example data flow for content optimized encoding of video data, according to some embodiments.

For example, as illustrated by data flow 1000 in FIG. 10, a video-encoding module 1004 may take as input a media item 1002, a bitrate 1006 for media item 1002 (e.g., as determined, received, selected, etc. at step 320), and an optimal resolution 1008 for media item 1002 (e.g., as determined, received, selected, etc. at step 350) and may output an encoded media item 1010 having bitrate 1006 and optimal resolution 1008.

As discussed throughout the is the disclosure, the systems and methods disclosed herein may provide one or and advantages over traditional options for selecting resolutions for content optimized encoding of video data. For example, by adjusting an overall error model based on a bitrate cost associated with streaming of media item within a bitrate lane, embodiments of the systems and methods described herein may achieve significant reductions in MTBR/stall metrics regressions with only minimal impact to quality metrics.

EXAMPLE EMBODIMENTS

Example 1: A computer-implemented method comprising (1) receiving a media item for encoding via a content optimized encoding algorithm, (2) determining, in accordance with the content optimized encoding algorithm, an overall error model for the media item comprising (a) a rate-distortion model for the media item, and (b) a downsampling-distortion model for the media item, (3) determining, based on the overall error model, a bitrate cost associated with streaming of the media item within a bitrate lane, (4) adjusting the overall error model based on the bitrate cost associated with streaming of the media item within the bitrate lane, and (5) encoding the media item for streaming within the bitrate lane based on the adjusted overall error model.

Example 2: The computer-implemented method of example 1, wherein (1) the media item comprises an original resolution, and (2) the computer-implemented method further comprises resampling the media item from the original resolution to a plurality of different resolutions by generating a plurality of resampled versions of the media item, each resampled version of the media item included in the plurality of resampled versions of the media item having a different resampled resolution.

Example 3: The computer-implemented method of example 2, wherein encoding the media item for streaming within the bitrate lane based on the adjusted overall error model comprises (1) selecting, based on the bitrate lane and the adjusted overall error model (a) a target resolution for an encoded version of the media item, and (b) a resampled version of the media item from the plurality of resampled versions of the media item, and (2) generating the encoded version of the media item by encoding the resampled version of the media item for streaming via the bitrate lane.

Example 4: The computer-implemented method of example 3, wherein selecting the target resolution for the encoded version of the media item comprises using the adjusted overall error model to determine a downsampling ratio that minimizes an overall distortion of the encoded version of the media item, the overall distortion of the encoded version of the media item comprising a summation of a coding error derived from the rate-distortion model, a downsampling error derived from the downsampling-distortion model, and the bitrate cost associated with streaming of the encoded version of the media item within the bitrate lane.

Example 5: The computer-implemented method of any of examples 1-4, wherein (1) the media item comprises an original resolution, (2) determining the rate-distortion model for the media item comprises (a) encoding the media item at multiple bitrates to create multiple encoded media items at the original resolution, and (b) estimating the rate-distortion model based on a distortion of each of the multiple encoded media items.

Example 6: The computer-implemented method of any of examples 1-5, wherein (1) the media item comprises an original resolution, and (2) determining the downsampling-distortion model for the media item comprises (a) downsampling, from the original resolution, the media item at multiple downsampling ratios to create multiple downsampled media items. (b) estimating the downsampling-distortion model based on a distortion of each of the multiple downsampled media items.

Example 7: The computer-implemented method of any of examples 1-6, wherein the bitrate cost comprises a relationship between downsampling ratio and total mean-squared error associated with the bitrate lane in the overall error model.

Example 8: The computer-implemented method of example 7, wherein the bitrate cost is proportional to total mean-squared error in the overall error model.

Example 9: The computer-implemented method of any of examples 7-8, wherein the bitrate cost is proportional to downsampling ratio in the overall error model.

Example 10: The computer-implemented method of example 9, wherein the bitrate cost is logarithmically proportional to downsampling ratio in the overall error model.

Example 11: The computer-implemented method of any of examples 1-10, wherein determining the bitrate cost associated with streaming of the media item comprises determining (1) a multiplier for the bitrate cost, and (2) the bitrate cost associated with streaming of the media item within the bitrate lane based on the multiplier.

Example 12: The computer-implemented method of any of examples 1-11, wherein adjusting the overall error model based on the bitrate cost associated with streaming of the media item within the bitrate lane comprises introducing a bias into the overall error model based on the bitrate cost.

Example 13: A system comprising (1) a receiving module, stored in memory, that receives a media item for encoding via a content optimized encoding algorithm, (2) a determining module, stored in memory, that determines, in accordance with the content optimized encoding algorithm, an overall error model for the media item comprising (a) a rate-distortion model for the media item, and (b) a downsampling-distortion model for the media item, (3) a cost module, stored in memory, that determines, based on the overall error model, a bitrate cost associated with streaming of the media item within a bitrate lane, (4) an adjusting module, stored in memory, that adjusts the overall error model based on the bitrate cost associated with streaming of the media item within the bitrate lane, (5) an encoding module, stored in memory, that encodes the media item for streaming within the bitrate lane based on the adjusted overall error model, and (6) at least one physical processor that executes the receiving module, the determining module, the cost module, the adjusting module, and the encoding module.

Example 14: The system of example 13, wherein (1) the media item comprises an original resolution, and (2) the determining module further resamples the media item from the original resolution to a plurality of different resolutions by generating a plurality of resampled versions of the media item, each resampled version of the media item included in the plurality of resampled versions of the media item having a different resampled resolution.

Example 15: The system of example 14, wherein the encoding module encodes the media item for streaming within the bitrate lane based on the adjusted overall error model by (1) selecting, based on the bitrate lane and the adjusted overall error model (a) a target resolution for an encoded version of the media item, and (b) a resampled version of the media item from the plurality of resampled versions of the media item, and (2) generating the encoded version of the media item by encoding the resampled version of the media item for streaming via the bitrate lane.

Example 16: The system of example 15, wherein the encoding module selects the target resolution for the encoded version of the media item by using the adjusted overall error model to determine a downsampling ratio that minimizes an overall distortion of the encoded version of the media item, the overall distortion of the encoded version of the media item comprising a summation of a coding error derived from the rate-distortion model, a downsampling error derived from the downsampling-distortion model, and the bitrate cost associated with streaming of the encoded version of the media item within the bitrate lane.

Example 17: The system of any of examples 13-16, wherein (1) the media item comprises an original resolution, (2) the determining module determines the rate-distortion model for the media item by (a) encoding the media item at multiple bitrates to create multiple encoded media items at the original resolution, and (b) estimating the rate-distortion model based on a distortion of each of the multiple encoded media items.

Example 18: The system of any of examples 13-17, wherein (1) the media item comprises an original resolution, and (2) the determining module determines the downsampling-distortion model for the media item by (a) downsampling, from the original resolution, the media item at multiple downsampling ratios to create multiple downsampled media items, and (b) estimating the downsampling-distortion model based on a distortion of each of the multiple downsampled media items.

Example 19: The system of any of examples 13-18 wherein the adjusting module adjusts the overall error model based on the bitrate cost associated with streaming of the media item within the bitrate lane by introducing a bias into the overall error model based on the bitrate cost.

Example 20: A non-transitory computer-readable medium comprising computer-readable instructions that, when executed by at least one processor of a computing system, cause the computing system to (1) receive a media item for encoding via a content optimized encoding algorithm, (2) determine, in accordance with the content optimized encoding algorithm, an overall error model for the media item comprising (a) a rate-distortion model for the media item, and (b) a downsampling-distortion model for the media item, (3) determine, based on the overall error model, a bitrate cost associated with streaming of the media item within a bitrate lane, (4) adjust the overall error model based on the bitrate cost associated with streaming of the media item within the bitrate lane, and (5) encode the media item for streaming within the bitrate lane based on the adjusted overall error model.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive media data (e.g., one or more media items) to be transformed, transform the media data, output a result of the transformation to re-encode (e.g., transcode) the media data, use the result of the transformation to stream the media data to one or more client devices, and store the result of the transformation to stream the media data to additional media devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a media item for encoding via a content optimized encoding algorithm;
   determining, in accordance with the content optimized encoding algorithm, an overall error model for the media item comprising:
      a rate-distortion model for the media item; and
      a downsampling-distortion model for the media item;
   determining, based on the overall error model, a bitrate cost associated with streaming of the media item within a bitrate lane;
   adjusting the overall error model based on the bitrate cost associated with streaming of the media item within the bitrate lane; and
   encoding the media item for streaming within the bitrate lane based on the adjusted overall error model by selecting, based on the bitrate lane and the adjusted overall error model, a target resolution for an encoded version of the media item using the adjusted overall error model to determine a downsampling ratio that minimizes an overall distortion of the encoded version of the media item.

2. The computer-implemented method of claim 1, wherein:
the media item comprises an original resolution; and
the computer-implemented method further comprises resampling the media item from the original resolution to a plurality of different resolutions by generating a plurality of resampled versions of the media item, each resampled version of the media item included in the plurality of resampled versions of the media item having a different resampled resolution.

3. The computer-implemented method of claim 2, wherein encoding the media item for streaming within the bitrate lane based on the adjusted overall error model further comprises:
selecting, based on the bitrate lane and the adjusted overall error model,
a resampled version of the media item from the plurality of resampled versions of the media item; and
generating the encoded version of the media item by encoding the resampled version of the media item for streaming via the bitrate lane.

4. The computer-implemented method of claim 3, wherein the overall distortion of the encoded version of the media item comprises a summation of a coding error derived from the rate-distortion model, a downsampling error derived from the downsampling-distortion model, and the bitrate cost associated with streaming of the encoded version of the media item within the bitrate lane.

5. The computer-implemented method of claim 1, wherein:
the media item comprises an original resolution;
determining the rate-distortion model for the media item comprises:
encoding the media item at multiple bitrates to create multiple encoded media items at the original resolution; and
estimating the rate-distortion model based on a distortion of each of the multiple encoded media items.

6. The computer-implemented method of claim 1, wherein:
the media item comprises an original resolution; and
determining the downsampling-distortion model for the media item comprises:
downsampling, from the original resolution, the media item at multiple downsampling ratios to create multiple downsampled media items; and
estimating the downsampling-distortion model based on a distortion of each of the multiple downsampled media items.

7. The computer-implemented method of claim 1, wherein the bitrate cost comprises a relationship between downsampling ratio and total mean-squared error associated with the bitrate lane in the overall error model.

8. The computer-implemented method of claim 7, wherein the bitrate cost is directly proportional to total mean-squared error in the overall error model.

9. The computer-implemented method of claim 7, wherein the bitrate cost is directly proportional to downsampling ratio in the overall error model.

10. The computer-implemented method of claim 9, wherein the bitrate cost is directly proportional to a common logarithm of downsampling ratio in the overall error model.

11. The computer-implemented method of claim 1, wherein determining the bitrate cost associated with streaming of the media item comprises determining:
a multiplier for the bitrate cost; and
the bitrate cost associated with streaming of the media item within the bitrate lane based on the multiplier.

12. The computer-implemented method of claim 1, wherein adjusting the overall error model based on the bitrate cost associated with streaming of the media item within the bitrate lane comprises introducing a bias into the overall error model based on the bitrate cost.

13. A system comprising:
a receiving module, stored in memory, that receives a media item for encoding via a content optimized encoding algorithm;
a determining module, stored in memory, that determines, in accordance with the content optimized encoding algorithm, an overall error model for the media item comprising:
a rate-distortion model for the media item; and
a downsampling-distortion model for the media item;
a cost module, stored in memory, that determines, based on the overall error model, a bitrate cost associated with streaming of the media item within a bitrate lane;
an adjusting module, stored in memory, that adjusts the overall error model based on the bitrate cost associated with streaming of the media item within the bitrate lane;
an encoding module, stored in memory, that encodes the media item for streaming within the bitrate lane based on the adjusted overall error model by selecting, based on the bitrate lane and the adjusted overall error model, a target resolution for an encoded version of the media item using the adjusted overall error model to determine a downsampling ratio that minimizes an overall distortion of the encoded version of the media item; and
at least one physical processor that executes the receiving module, the determining module, the cost module, the adjusting module, and the encoding module.

14. The system of claim 13, wherein:
the media item comprises an original resolution; and
the determining module further resamples the media item from the original resolution to a plurality of different resolutions by generating a plurality of resampled versions of the media item, each resampled version of the media item included in the plurality of resampled versions of the media item having a different resampled resolution.

15. The system of claim 14, wherein the encoding module encodes the media item for streaming within the bitrate lane based on the adjusted overall error model by:
selecting, based on the bitrate lane and the adjusted overall error model,
a resampled version of the media item from the plurality of resampled versions of the media item; and
generating the encoded version of the media item by encoding the resampled version of the media item for streaming via the bitrate lane.

16. The system of claim 15, wherein the overall distortion of the encoded version of the media item comprises a summation of a coding error derived from the rate-distortion model, a downsampling error derived from the downsampling-distortion model, and the bitrate cost associated with streaming of the encoded version of the media item within the bitrate lane.

17. The system of claim 13, wherein:
the media item comprises an original resolution;
the determining module determines the rate-distortion model for the media item by:
encoding the media item at multiple bitrates to create multiple encoded media items at the original resolution; and
estimating the rate-distortion model based on a distortion of each of the multiple encoded media items.

18. The system of claim 13, wherein:
the media item comprises an original resolution; and
the determining module determines the downsampling-distortion model for the media item by:
downsampling, from the original resolution, the media item at multiple downsampling ratios to create multiple downsampled media items; and
estimating the downsampling-distortion model based on a distortion of each of the multiple downsampled media items.

19. The system of claim 13, wherein the adjusting module adjusts the overall error model based on the bitrate cost associated with streaming of the media item within the bitrate lane by introducing a bias into the overall error model based on the bitrate cost.

20. A non-transitory computer-readable medium comprising computer-readable instructions that, when executed by at least one processor of a computing system, cause the computing system to:
receive a media item for encoding via a content optimized encoding algorithm;
determine, in accordance with the content optimized encoding algorithm, an overall error model for the media item comprising:
a rate-distortion model for the media item; and
a downsampling-distortion model for the media item;
determine, based on the overall error model, a bitrate cost associated with streaming of the media item within a bitrate lane;
adjust the overall error model based on the bitrate cost associated with streaming of the media item within the bitrate lane; and
encode the media item for streaming within the bitrate lane based on the adjusted overall error model by selecting, based on the bitrate lane and the adjusted overall error model, a target resolution for an encoded version of the media item using the adjusted overall error model to determine a downsampling ratio that minimizes an overall distortion of the encoded version of the media item.

* * * * *